(12) United States Patent
Milicevic et al.

(10) Patent No.: US 8,147,004 B2
(45) Date of Patent: Apr. 3, 2012

(54) VEHICLE WHEEL RIM PROTECTOR

(75) Inventors: Slobodan Milicevic, Belgrade (RS);
Srdjan Markovic, Costa Mesa, CA (US)

(73) Assignee: Slobodan Milicevic, Costa Mesa, CA (US)

( * ) Notice: Subject to any disclaimer, the term of this patent is extended or adjusted under 35 U.S.C. 154(b) by 0 days.

(21) Appl. No.: 12/786,727

(22) Filed: May 25, 2010

(65) Prior Publication Data

US 2011/0291463 A1    Dec. 1, 2011

(51) Int. Cl.
*B60B 7/01*    (2006.01)
(52) U.S. Cl. .................... 301/37.24; 301/37.23
(58) Field of Classification Search ............ 301/5.21, 301/5.22, 37.22, 37.23, 37.24
See application file for complete search history.

(56) References Cited

U.S. PATENT DOCUMENTS

| | | | | |
|---|---|---|---|---|
| 2,361,406 A | * | 10/1944 | Lyon | 301/37.101 |
| 2,485,936 A | * | 10/1949 | Stroberg | 301/5.21 |
| 2,585,140 A | * | 2/1952 | Lencki | 301/5.21 |
| 2,621,979 A | | 12/1952 | Barnes | |
| 2,709,472 A | | 5/1955 | Hofweber | |
| 2,714,039 A | * | 7/1955 | Pouell | 301/5.21 |
| 2,801,883 A | * | 8/1957 | Householder | 301/5.22 |
| 2,915,335 A | | 12/1959 | Barnes | |
| 2,963,319 A | * | 12/1960 | Barnes | 301/37.34 |
| 2,964,357 A | * | 12/1960 | Barnes | 301/37.23 |
| 2,977,151 A | | 3/1961 | Ford, Jr. | |
| 3,202,459 A | * | 8/1965 | Pierce | 301/5.22 |
| 3,773,389 A | * | 11/1973 | Foster et al. | 301/37.31 |
| 4,269,451 A | * | 5/1981 | Narang | 301/5.21 |
| 4,422,490 A | | 12/1983 | Power | |
| 5,071,684 A | | 12/1991 | Gewecke | |
| 5,232,032 A | | 8/1993 | Diernaz | |
| 5,232,034 A | | 8/1993 | Gergele | |
| 5,967,212 A | | 10/1999 | Hameed | |
| 2005/0012383 A1 | * | 1/2005 | Hsieh | 301/37.102 |
| 2007/0290548 A1 | * | 12/2007 | Lundy | 301/37.24 |
| 2009/0026832 A1 | * | 1/2009 | Baumgartner | 301/37.24 |
| 2009/0230757 A1 | * | 9/2009 | Chancharoen | 301/5.21 |

FOREIGN PATENT DOCUMENTS

WO    WO 2010070254 A2 *    6/2010

* cited by examiner

*Primary Examiner* — Kip T Kotter
(74) *Attorney, Agent, or Firm* — Charmasson, Buchaca & Leach, LLP

(57) ABSTRACT

A wheel rim protective structure has a closed ring made of a semi-rigid durable plastic material. A plurality of spaced apart durable curved metal clips extend from the inner edge of the ring and are oriented to insert between the tire and rim. Each clip has a number of unidirectional barbs that facilitate installation but resist unwanted extraction by engaging the tire portion. Knurling on the opposite side provides more static friction against the wheel surface. The metal clips also provided a situs for a low profile fastener to allow other structures to be attached to the ring such as decorative panels, lights, flags streamers, or other decorative or counterbalancing structures. The ring and clips can be made from a unitary piece of injection molded material.

13 Claims, 6 Drawing Sheets

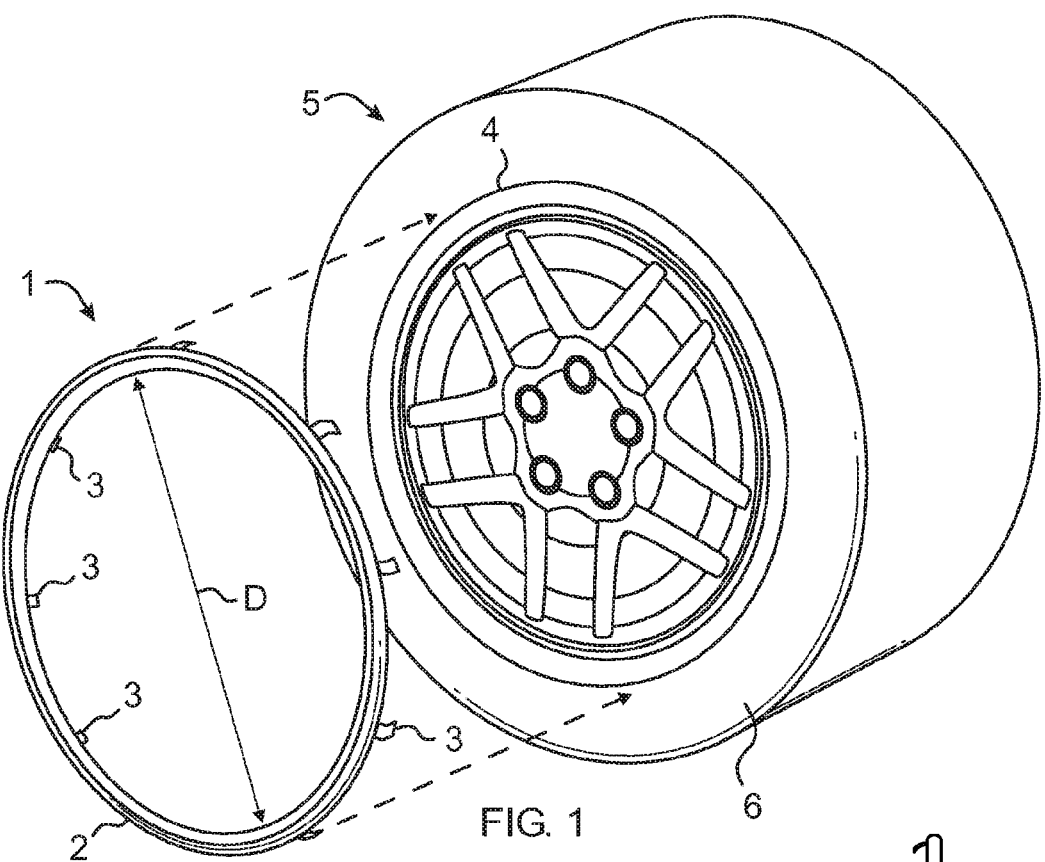
FIG. 1
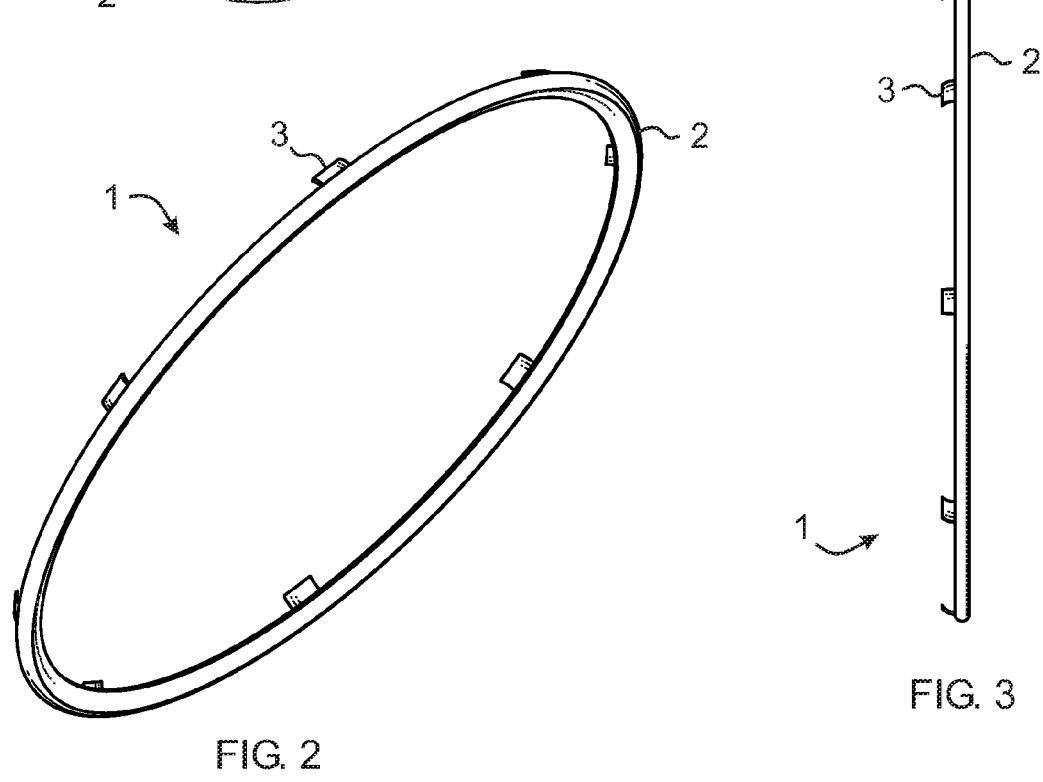
FIG. 2
FIG. 3

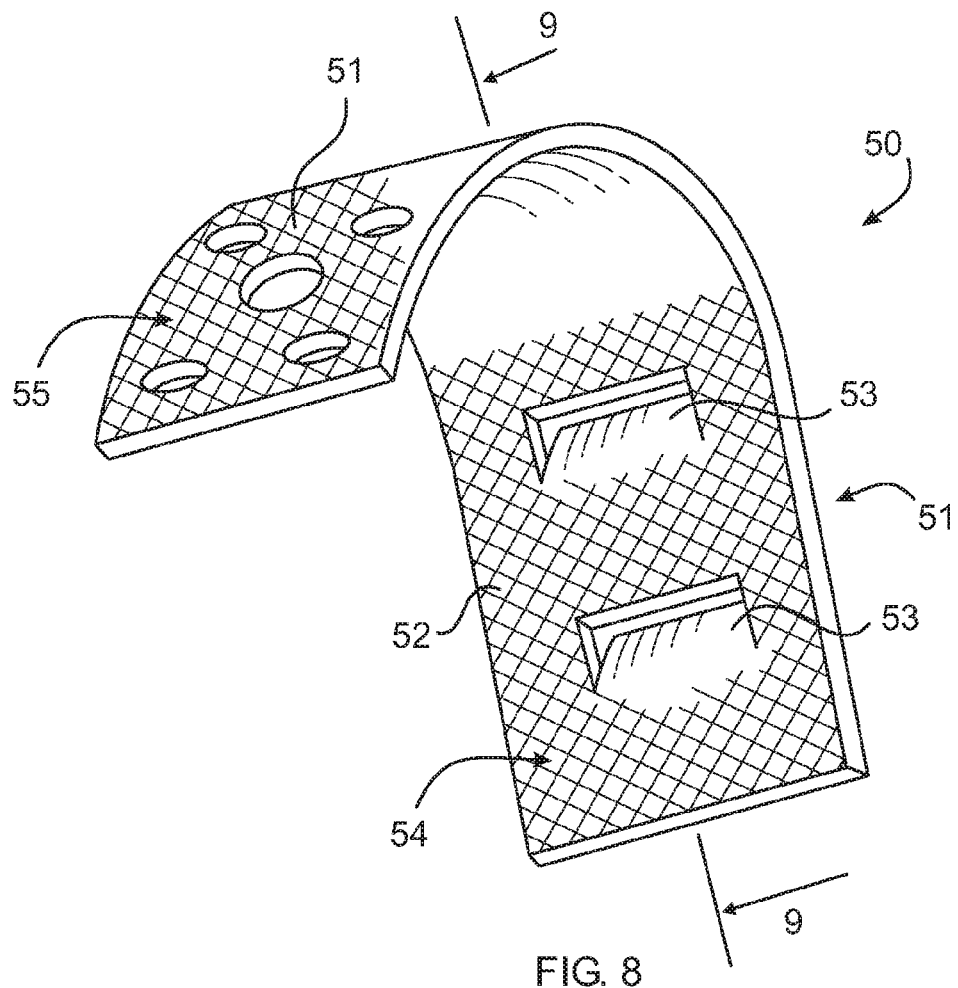
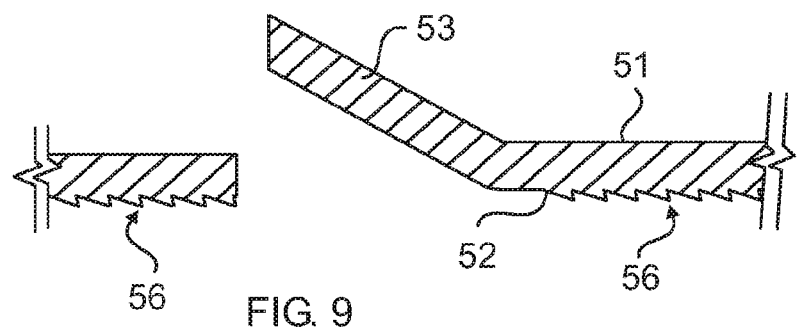

VEHICLE WHEEL RIM PROTECTOR

FIELD OF THE INVENTION

The invention relates to motor vehicle accessories and more particularly to devices for protecting and augmenting the appearance of automobiles.

BACKGROUND

Decorative automotive wheels for mounting tires have enjoyed recent popularity. So called "alloy wheels" often feature distinctive designs and highly polished metal surfaces. Such wheels can be very expensive. The exposed circular outboard peripheral edge of the wheel, also known as the "rim" is located to directly support the outboard circular inner bead of a tire. Thus the rim is positioned to inadvertently contact the raised curbs at the side of a road during a parking maneuver. Such contact can result in unsightly dents and scratches being formed on the exposed outer surface of the rim.

As disclosed in Hameed U.S. Pat. No. 5,967,212 (hereinafter "Hameed"), a broken plastic ring can be mounted to the wheel to act as a protective shield over the rim.

Unfortunately, such a device can suffer from some drawbacks. First, it can be difficult to adequately secure the ring to the wheel. Hameed shows a flange portion (20 in FIG. 2) which extends axially inwardly between the tire and the wheel. So placing a layer of material between the tire and wheel can lead to improper contact between the tire and wheel leading to deflation, and or slippage.

Further, the rigorous environment of automobile wheels can quickly wear plastic parts. Automotive wheels are often subjected to wide variations in temperatures, pressures, strong centrifugal forces at high vehicle speeds, shocks, water etc. Temperature variations can cause differential expansion or contraction between the wheel rim and a ring made from a material having a different coefficient of thermal expansion. Such differences in expansion/contraction can lead to separations and misalignments of the ring with respect to the wheel.

As disclosed in Gewecke, U.S. Pat. No. 5,071,684, an extruded flexible decorative trim attachment can be secured to the wheel by deflating the tire to substantially atmospheric pressure in order to work the flexible anchor portion into space between the tire and rim. Deflating the tire in this way is a task more suited to a mechanic in a professional automotive garage rather than a home user.

Both the Hameed and Gewecke devices are oblong extrusion-type structures that result in a break where the ends meet to form the ring. The presence of the break can lead to the formation of gaps, overlaps or buckling which can be both unsightly and lead to the capturing of dirt or other fouling which reduces the protective ability of the device and can lead to its dislodgement from the wheel.

Increasingly, automotive accessories are being installed by relatively unskilled technicians or end users who may have little experience in mounting tires to wheels. Therefore, the device needs to be relatively simple to install to ensure adequate and more consistent installation.

Therefore there is a need for a decorative wheel rim protector which addresses some or all of the above identified inadequacies.

SUMMARY

It is an object of the invention are to help provide an improved decorative wheel rim protector device.

In some embodiments there is provided a detachable protective device for vehicle wheels, said device comprises: a substantially circular closed ring having an axial outer surface and an axial inner surface; a plurality of angularly spaced apart clips extending inwardly from said inner surface; wherein each of said clips comprises: an arcuate body having a first proximal portion secured to said ring, and a second distal portion shaped and dimensioned to be inserted between a wheel rim and a tire.

In some embodiments said ring is made from a substantially semi-rigid injection moldable material and said clips are made from a durable malleable material.

In some embodiments said injection-moldable material is selected from the group consisting of plastic, ABS (acrylonitrile butadiene styrene), PVC (polyvinyl chloride), acetal, acrylic, nylon, phenylene oxide, polycarbonate, polyester, polyethylene, polypropylene, polysulfone, styrene, urethane, and vinyl plastics and combinations and mixtures thereof.

In some embodiments said malleable material is selected from the group consisting of stainless steel and alloys thereof.

In some embodiments said distal portion has a first surface oriented to contact said tire and an opposite second surface oriented to contact said wheel rim.

In some embodiments wherein said first surface comprises a first substantially unidirectional friction-enhancing element.

In some embodiments said first surface comprises a barb structure oriented to resist extraction of said clip.

In some embodiments said second surface comprises a second friction-enhancing element.

In some embodiments said second friction-enhancing element comprises texturing.

In some embodiments said outer surface is convex and said inner surface is concave.

In some embodiments said proximal portion is shaped and dimensioned to have a first through hole engaged by an interconnect portion of said ring.

In some embodiments said device further comprises at least one fastening element oriented to releaseably secure a first attachment to said ring.

In some embodiments said proximal portion is shaped and dimensioned to have a first threaded aperture.

In some embodiments said first attachment is selected from the group consisting of: mirrors, flags, streamers, light modules, reflectors, balancing weights, and combinations thereof.

In some embodiments said ring and said clips are formed integrally to one another from a common material.

In some embodiments there is provided that in the combination of a vehicle wheel rim and a tire mounted thereon, and a detachable protective device, wherein said device comprises: a substantially circular closed ring having an outer surface and an inner surface; a plurality of angularly spaced apart clips extending axially rearwardly and inwardly from said inner surface; wherein each of said clips comprises: an arcuate body having a first proximal portion secured to said ring, and a second distal portion inserted between said wheel rim and said tire.

In some embodiments the protector constitutes a novel ornamental design as shown in the drawing.

BRIEF DESCRIPTION OF THE DRAWINGS

FIG. 1 is a diagrammatic perspective view of a decorative protector for attachment to a wheel rim according to an exemplary embodiment of the invention.

FIG. 2 is an oblique view of the decorative wheel rim protector.

FIG. 3 is a side view of the decorative wheel rim protector of FIG. 2.

FIG. 8 is a diagrammatic perspective view of an alternate embodiment of a mounting clip having a threaded bore and friction enhancing texturing.

FIG. 9 is a cross-sectional side view of a portion of the clip of FIG. 8 taken along line 9-9 showing the unidirectional friction-enhancing barb and sawtooth texturing.

DESCRIPTION OF THE EXEMPLARY EMBODIMENTS

Figure 4:
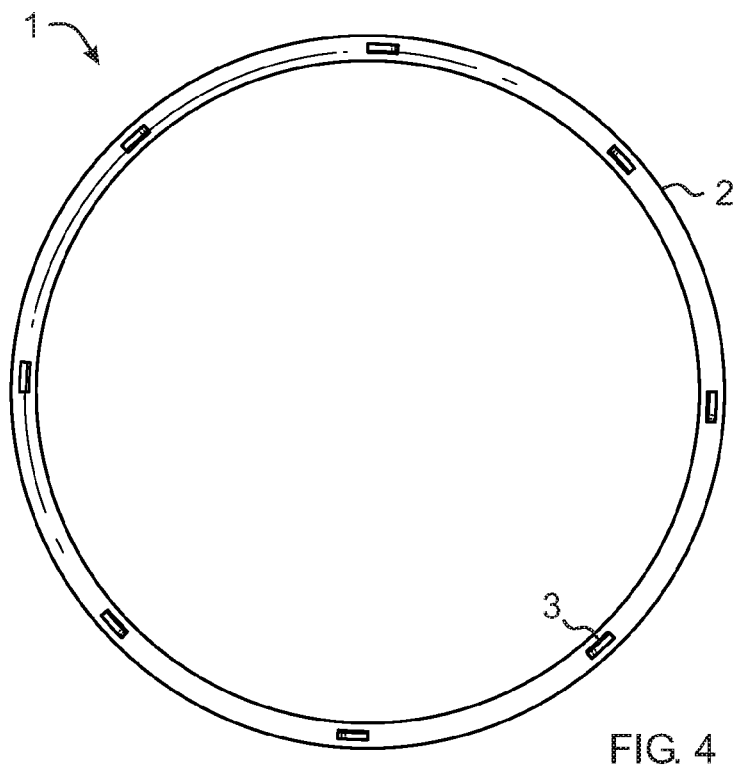
FIG. 4 is a back view of the decorative wheel rim protector of FIG. 2.
Figure 5:
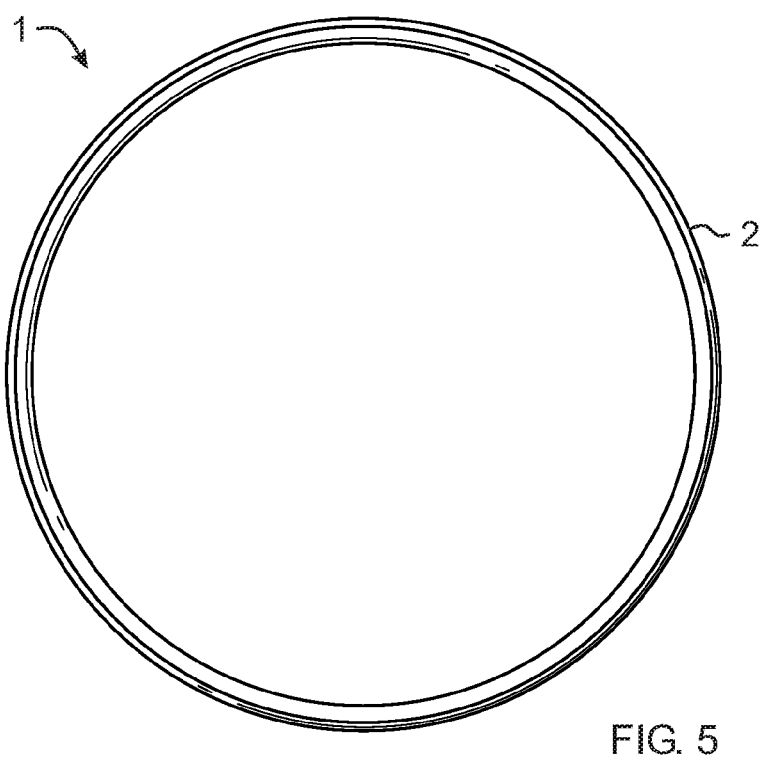
FIG. 5 is a front view of the decorative wheel rim protector of FIG. 2.

Referring now to the drawing there is shown in FIGS. 1-7 a decorative rim protector 1 having a substantially circular ring 2 from which extend a plurality of spaced apart mounting clips 3 located and oriented to mount the protector to the circumferential outer rim 4 of a vehicle wheel 5. Therefore, the ring has a diameter D substantially commensurate with the diameter of the wheel rim.

The ring 2 can be formed from a unitary piece of inexpensive, durable, and readily moldable material such a durable rigid plastic. Candidate materials include but are not limited to ABS (acrylonitrile butadiene styrene), PVC (polyvinyl chloride) acetal, acrylic, nylon, phenylene oxide, polycarbonate, polyester, polyethylene, polypropylene, polysulfone, styrene, urethane, and vinyl plastics to name a few. In addition the outer surface of the ring can be coated with a layer of chrome, paint or other decorative and potentially protective material.

The ring can be injection molded rather than extruded so that the ring can be made as a closed circle. In other words, the ring can be made to be lacking a break which would be found in a non-closed circular ring. In this way the protector can be made to avoid the formation of an unsightly gap at the location of the break due to the ring having a circumference smaller than the circumference of the rim to which it attaches. Further, the absence of a break helps avoid unsightly buckling of the ring where the two ends of a broken ring would join or overlap due to the ring having a circumference larger than the circumference of the rim to which it attaches.

Figure 6:
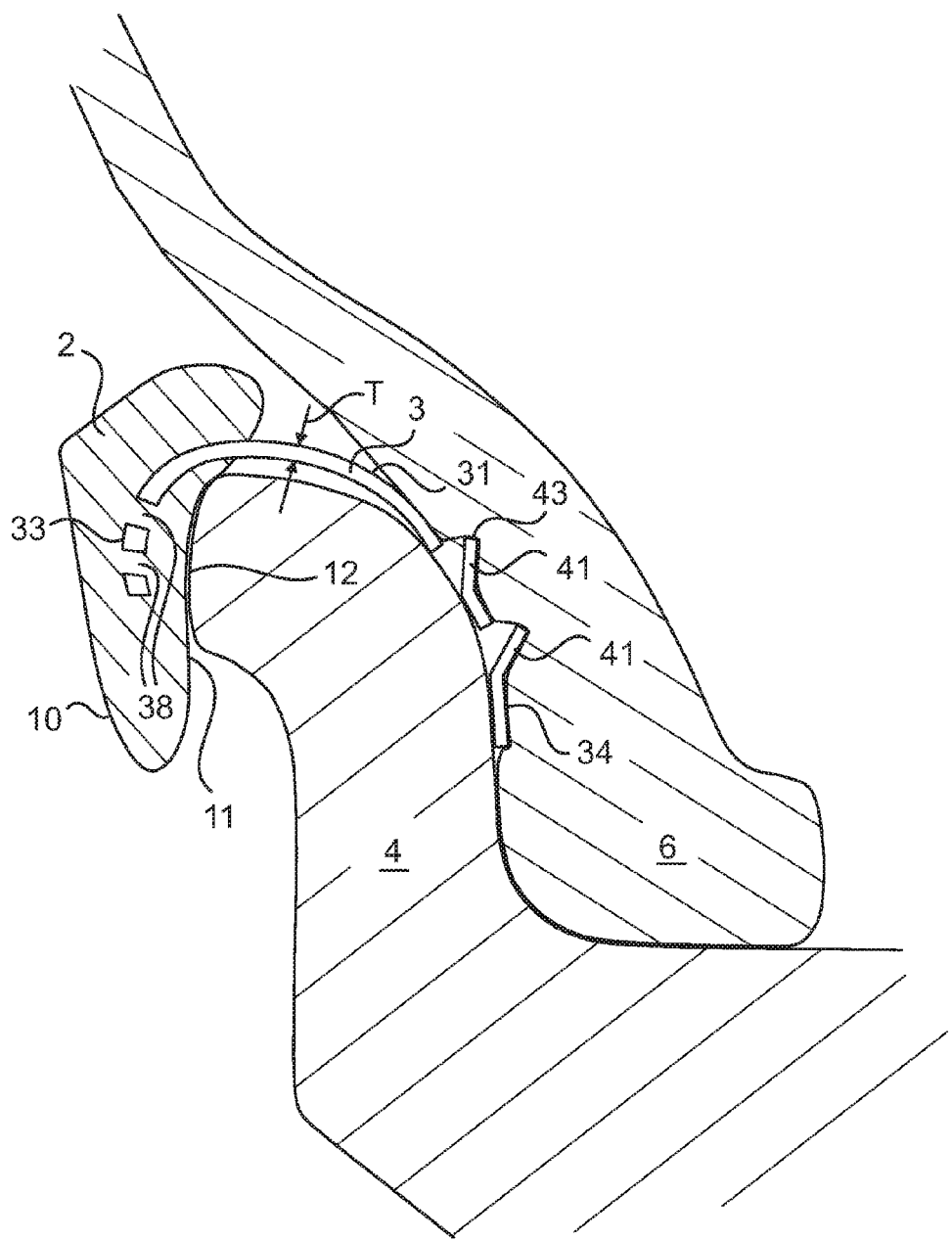
FIG. 6 is a diagrammatic cross-sectional side view of the decorative protector attached to a wheel rim.

As shown in FIG. 6, the ring 2 has a generally arcuate cross-sectional shape to create a substantially convex, rounded, outer, exposed surface 10 and an opposite concave, rounded, inner surface 11 oriented to at least partially rest against the peripheral outer flange 12 of a wheel rim 4. Further, the shape of the concave inner surface 11 can be selected to be substantially commensurate with the outer surface of the flange and thus allow for close nesting of the ring against the rim along is point of contact for a firmer fit and thus greater protection. Most surfaces are rounded to avoid spaces where dirt can collect.

As described above, a plurality of mounting clips 3 are positioned in a spaced apart manner around the circumference ring 2 extending substantially axially rearwardly and inwardly therefrom to engage the wheel rim. The clips can be evenly spaced apart to help maintain rotational balance of the protector. Although eight clips are shown, the device accommodates use of other numbers of clips depending on factors such as cost, clip width, and bonding strength desired between the protector and the wheel rim.

Figure 7:
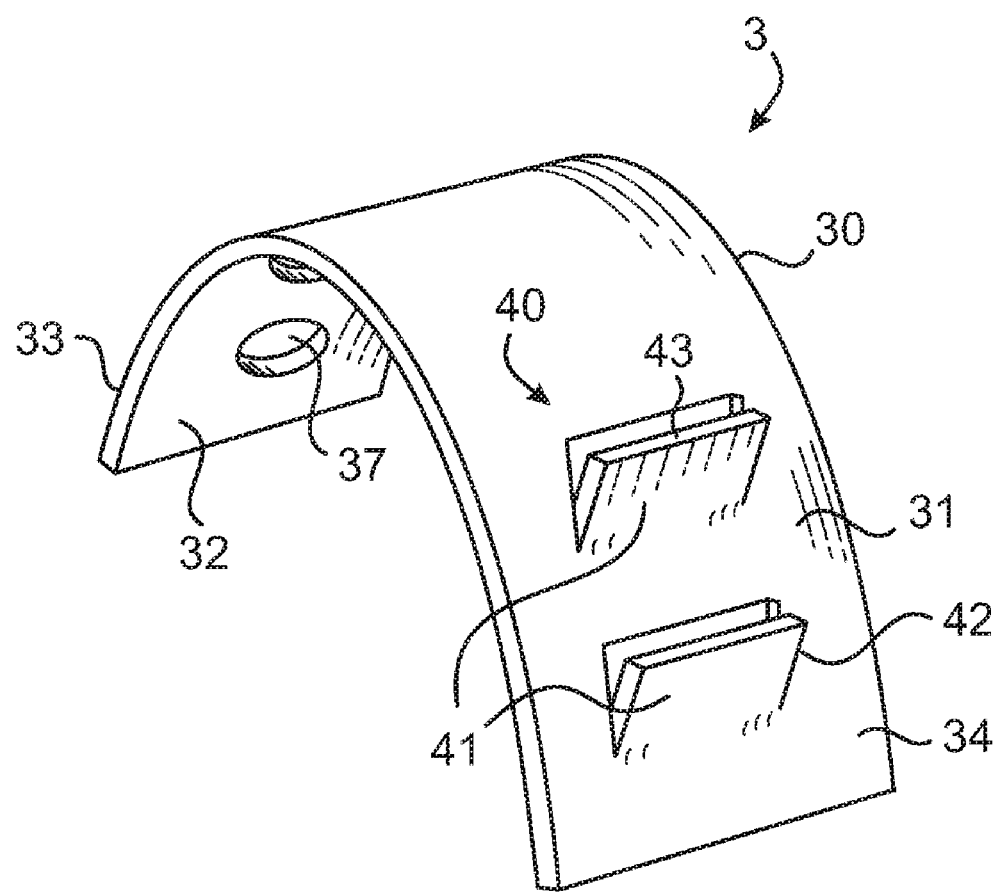
FIG. 7 is a diagrammatic perspective view of an embodiment of a mounting clip.

As shown primarily in FIGS. 6 and 7, each mounting clip 3 has a substantially rigid, generally arcuate sheet body 30 having a thickness T of between about 1 millimeter and about 3 millimeter separating an arcuate, convex, top surface 31 from a substantially parallel arcuate, concave, bottom surface 32. The body has a first proximal portion 33 for bonding to the ring and an opposite distal portion 34 oriented, shaped and dimensioned for being inserted and held in place by friction between a wheel rim 4 and a wheel mounted tire 6. The body can be made from a unitary piece of durable, rigid, and malleable material such as rolled and stamped stainless steel or rigid durable plastic.

The clips 3 can be precisely positioned and automatically bonded to the ring 2 at the time it is formed. This is done by positioning the clips so that their proximal portions 33 extend into the ring mold. As material is injected into the mold to form the ring body, the molten material courses through and fills a number of engagement holes 37 in the clips. As the material solidifies, the material remaining in the holes form interconnects 38 which permanently fasten the clip to the ring.

Each clip can be further adapted to provide a friction enhancing structure 40 such as a number of barbs 41. The barbs are oriented to provide a substantially unidirectional friction function discouraging extraction of the clip once it has engaged between the rim 4 and tire 6. The barbs can be formed by stamping the clips and simultaneously cutting a substantially U-shaped channel through the sheet body from the top surface through to the bottom surface to form a tongue 42 of material which is bent outwardly toward the eventual location of the tire material. The end 43 of the tongue is this oriented to dig into the tire material more firmly as the clip is withdrawn thus restricting such motion. Alternately, one or more of the tongues can be bent inwardly to engage the wheel surface. Other friction enhancing structures known to the art may also be used.

As shown in FIGS. 8 and 9, a clip 50 can be further adapted so that its top surface 51 has unidirectional friction-enhancing structure such as barbs 53 similar to that shown in the embodiment of FIG. 7, and its bottom surface 52 has a texturing 54 (shown as a crosshatched shading in the drawing) to enhance its friction with the wheel rim. A portion 55 of the top surface can be similarly or otherwise textured. Many types of texturing can be used such as knurling, bumps, and/or divots. As shown in FIG. 9, the bottom surface 52 of the clip can be textured to have a more unidirectional friction function. Such a function can be provided by a texturing having a sawtooth cross-sectional structure 56.

Figure 10:
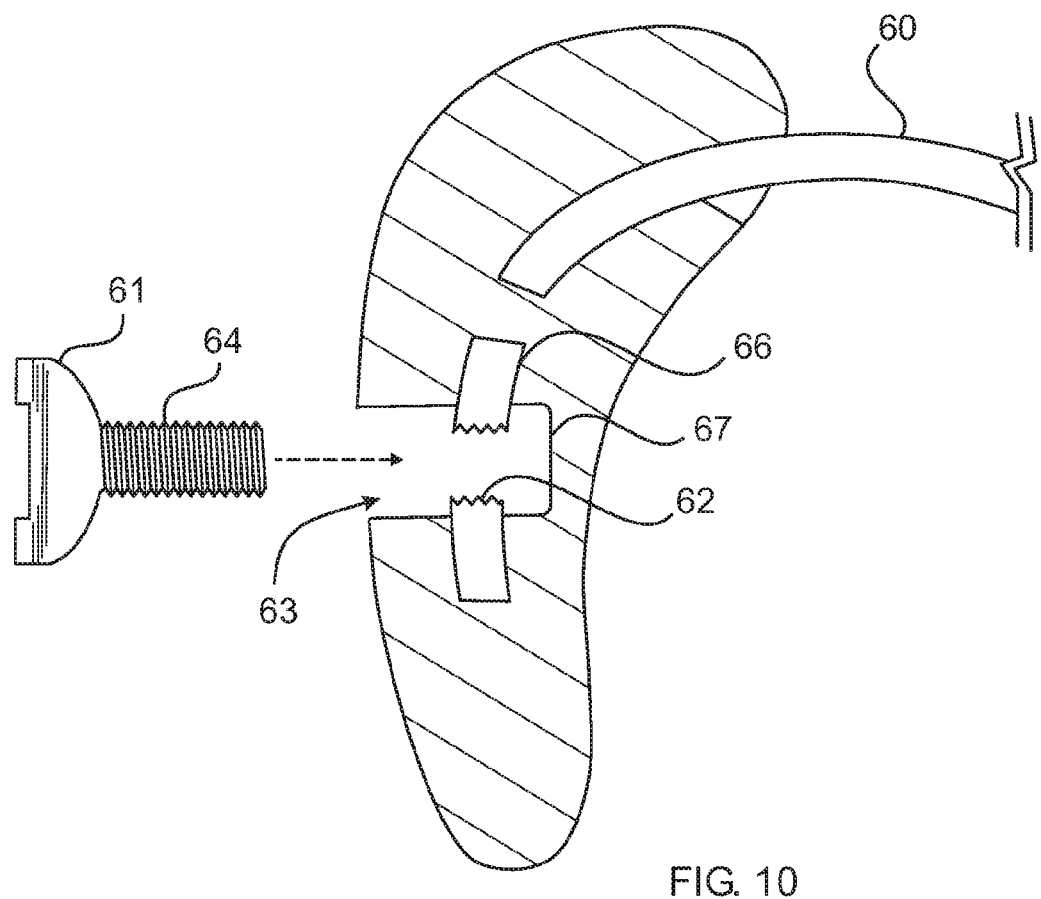
FIG. 10 is a diagrammatic cross-sectional side view of the decorative protector having a clip having a threaded bore for fastening a threaded attachment.

As shown in FIG. 10, a clip 60 can be further adapted to provide means for fastening and unfastening various attachment items 61 to the protector while it is secured to a wheel. Such items can include but are not limited to reflectors, flags, streamers such as piriata-style colored paper or fabric pieces, light modules, and other decorative or utilitarian items such as wheel balancing weights or curb sensors. Fastening means can include each mounting clip being adapted to have a threaded bore 62 in alignment with a passageway 63 oriented to be engaged by a commensurately threaded bolt 64 extending from an attachment item 61. The passageway can extend beyond the distal side 66 of the clip into a closed-ended well 67. The passageway preferably has a closed distal end to reduce fouling and to prevent threaded bolts from penetrating through the passageway to contact and potentially damage the wheel rim. The passageway can be made to have a diameter similar to the bore and be threaded in alignment with the bore. Alternately, the passageway can be oversized to allow passage of the bolt without substantial engagement.

Figure 11:
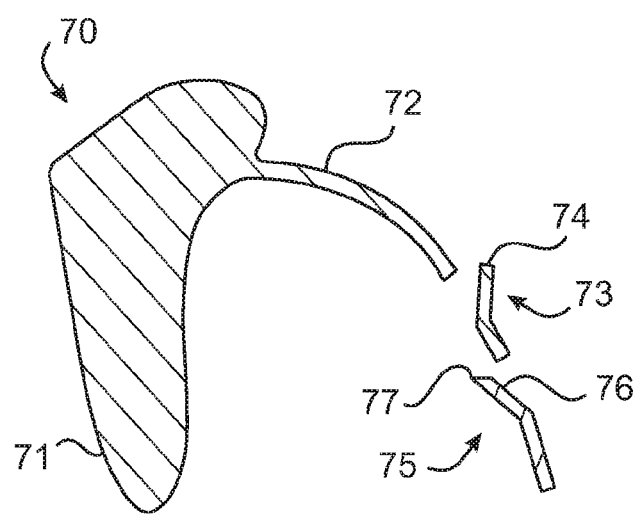
FIG. 11 is a diagrammatic cross-sectional side view of the decorative protector having a ring and clips made from a unitary piece of material.

As shown in FIG. 11 the protector 70 can be made from a unitary piece of moldable material such as plastic. The protector has a ring portion 71 similar to the embodiment of FIG. 1 and a number of clip portions 72 formed integrally with the ring portion from a common material. In this way the entire protector can be formed as a single piece in a single injection molding process. It should be noted that some post-molding machining can be used to form structures which are not readily moldable. In this embodiment a first barb 73 has a tongue portion 74 extending substantially radially outwardly and axially rearwardly to engage the tire portion, and a second barb 75 has a tongue portion 76 extending substantially radially inwardly and axially forwardly to engage the rim portion. The tongue portion of the second barb can be further adapted to have a sharpened distal point 77 for better grabbing a surface on the wheel. Because of the different materials typically used for the wheel rim and the tire, a single clip can employ both a sharpened barb 75 and a non-sharpened barb 73 as shown.

While the exemplary embodiments of the invention have been described, modifications can be made and other embodiments may be devised without departing from the spirit of the invention and the scope of the appended claims.

What is claimed is:

1. A detachable protective device for vehicle wheels, said device comprises:
   a substantially circular closed ring having an axial outer surface and an axial inner surface;
   a plurality of angularly spaced apart clips extending inwardly from said inner surface;
   wherein each of said clips comprises:
      an arcuate body having a first proximal portion secured to said ring, and a second distal portion shaped and dimensioned to be inserted between a wheel rim and a tire;
      wherein said proximal portion is shaped and dimensioned to have a first through hole engaged by an interconnect portion of said ring, wherein said interconnect portion is molded simultaneously and contiguously with material forming said ring; and,
      wherein said proximal portion is shaped and dimensioned to have a first threaded aperture.

2. The device of claim 1, wherein said ring is made from a substantially semi-rigid injection moldable material and said clips are made from a durable malleable material.

3. The device of claim 2, wherein said injection-moldable material is selected from the group consisting of plastic, ABS (acrylonitrile butadiene styrene), PVC (polyvinyl chloride), acetal, acrylic, nylon, phenylene oxide, polycarbonate, polyester, polyethylene, polypropylene, polysulfone, styrene, urethane, and vinyl plastics and combinations and mixtures thereof.

4. The device of claim 3, wherein said malleable material is selected from the group consisting of stainless steel and alloys thereof.

5. The device of claim 1, wherein said distal portion has a first surface oriented to contact said tire and an opposite second surface oriented to contact said wheel rim.

6. The device of claim 5, wherein said first surface comprises a first substantially unidirectional friction-enhancing element.

7. The device of claim 5, wherein said first surface comprises a barb structure oriented to resist extraction of said clip.

8. The device of claim 5, wherein said second surface comprises a second friction-enhancing element.

9. The device of claim 8, wherein said second friction-enhancing element comprises texturing.

10. The device of claim 1, wherein said outer surface is convex and said inner surface is concave.

11. The device of claim 1, wherein said device further comprises at least one fastening element oriented to releaseably secure a first attachment to said ring.

12. The device of claim 11, wherein said fastening element is selected from the group consisting of: a mirror fastening element, a streamer fastening element, a light module fastening element, a reflector fastening element, a balancing weight fastening element and combinations thereof.

13. The combination of a vehicle wheel rim and a tire mounted thereon, and a detachable protective device, wherein said device comprises:
   a substantially circular closed ring having an outer surface and an inner surface;
   a plurality of angularly spaced apart clips extending axially rearwardly and inwardly from said inner surface;
   wherein each of said clips comprises:
      an arcuate body having a first proximal portion secured to said ring, and a second distal portion inserted between said wheel rim and said tire;
      wherein said proximal portion is shaped and dimensioned to have a first through hole engaged by an interconnect portion of said ring, wherein said interconnect portion is molded simultaneously and contiguously with material forming said ring; and,
   wherein said proximal portion is shaped and dimensioned to have a first threaded aperture.

* * * * *